July 12, 1966    E. H. PORTER    3,260,902
MONOCRYSTAL TRANSISTORS WITH REGION FOR ISOLATING UNIT
Original Filed Oct. 5, 1962    3 Sheets-Sheet 1

INVENTOR.
EDWIN H. PORTER
BY
ATTORNEY

July 12, 1966  E. H. PORTER  3,260,902
MONOCRYSTAL TRANSISTORS WITH REGION FOR ISOLATING UNIT
Original Filed Oct. 5, 1962  3 Sheets-Sheet 2

INVENTOR.
EDWIN H. PORTER
BY
ATTORNEY

July 12, 1966  E. H. PORTER  3,260,902
MONOCRYSTAL TRANSISTORS WITH REGION FOR ISOLATING UNIT
Original Filed Oct. 5, 1962  3 Sheets-Sheet 3

EDWIN H. PORTER
INVENTOR.
BY *Roger S. Borovoy*
ATTORNEY

United States Patent Office 3,260,902
Patented July 12, 1966

3,260,902
MONOCRYSTAL TRANSISTORS WITH REGION FOR ISOLATING UNIT
Edwin Herbert Porter, Stanford, Calif., assignor to Fairchild Camera and Instrument Corporation, Syosset, Long Island, N.Y., a corporation of Delaware
Continuation of application Ser. No. 228,576, Oct. 5, 1962. This application June 10, 1964, Ser. No. 374,027
6 Claims. (Cl. 317—235)

The invention which follows is a new method of forming patterns within epitaxial layers of semiconductor material; new devices are made by this method. In particular, the invention provides a method of forming regions within an epitaxial layer by diffusion out from a substrate either during or subsequent to the epitaxial growth. New devices including isolation regions, improved epitaxial transistors, and isolated epitaxial transistors are made by the method of this invention. This application is a continuation application of copending application Serial No. 228, 576, filed October 5, 1962, now abandoned.

The recent trend in the semiconductor industry is towards integrated semiconductor circuitry. Integrated semiconductor circuits have more than one semiconductor device built into the same block of semiconductor material. Often a large number of such devices are so integrated, thereby achieving a substantial reduction in overall size of the circuit. In integrated circuits it is often essential that each semiconductor device be electrically isolated from the rest. In the past, an isolating region was sometimes diffused transversely through a wafer of semiconductor material of the opposite conductivity type to form two isolated regions upon opposite sides of the isolating region. The junctions between the isolated regions and the isolating region may be reverse-biased to provide more complete electrical isolation, or the isolating region may be left floating without an electrical connection to it.

There are two severe problems with this method of isolation. First, the diffused impurities of the isolating region not only diffuse transversely with respect to the wafer, but also diffuse laterally within it. This concomitant lateral diffusion cannot be prevented. It causes a portion of the final isolating region to be considerably wider than it was initially. This unnecessary width uses up valuable space on the block of semiconductor material. Because of it, a larger area must be allocated to each isolating region.

Second, when the isolating region is diffused completely through the substrate, a large junction is formed. If the junction is reverse-biased for improved isolation, a capacitance is created in the area of the junction. Where the junction surface area is large, the junction capacity is increased. This is not desirable for two reasons. First, this effective junction capacitor has to be either completely discharged or charged before the transistor can be switched from the non-conducting to the conducting state or vice versa, respectively. This increased switching time is undesirable in switching transistors. Second, the increased capacitance hinders high-frequency operation. Therefore, it would be advantageous to develop a way of providing smaller isolating regions, thus reducing junction size and capacity, decreasing switching time, and improving high-frequency operation.

Briefly, this invention provides a new way of forming patterns in an epitaxial layer of semiconductor material as follows: a pattern of impurities is formed on a substrate; an epitaxial layer of semiconductor material is formed over the substrate and over the pattern of impurities by methods well known in the art; and concurrent with growing the epitaxial layer, or thereafter if desired, the pattern of impurities is diffused into the epitaxial layer to form an impurity pattern within the epitaxial layer. It has been found that by using this method, it is possible to form very narrow isolation regions in a thin epitaxial layer. These small regions or walls have a low junction capacity, resulting in transistors which have faster switching time and improved high-frequency operation.

Novel epitaxial transistors may also be made by the method of the invention. These transistors have an additional low resistivity region between the substrate and the collector which is formed as a pattern on the substrate and diffused into the epitaxial layer according to the method of this invention. This additional region provides at least two substantial advantages. First, it acts as a sink for minority carriers, reducing minority carrier lifetime in the collector. The switching time of the transistor is therefore reduced. Second, a reduction in collector spreading resistance is achieved in certain applications of the transistor. When the substrate is of the opposite conductivity type from the collector (as it usually is when the transistor is isolated), and the junction between the substrate and the collector is reverse-biased to increase the effective isolation (as it conventionally is), all the collector current must pass through the narrow epitaxial high-resistivity collector region in order to reach the collector current normally placed on the top surface of the device. Current cannot flow into the substrate, as it could have if the device had had a substrate of the same conductivity type as the collector. It is not advisable to decrease the collector resistivity because that decreases the breakdown voltage of the device and increases the collector-base capacitance. Therefore, such a device has a high collector spreading resistance and a concomitantly high saturation voltage. A high saturation voltage is undesirable since an ideal switch has zero voltage drop across it when it is in the "ON" state; also a high saturation voltage results in increased power dissipation. Adding a low resistivity region beneath the collector, according to this invention, provides a low resistance path for this collector current, thereby decreasing the collector spreading resistance and the saturation voltage without reducing the breakdown voltage.

The method of this invention and a few of the many new devices, particularly epitaxial transistors and isolated epitaxial transistors, which are made by this method, will be better understood from the following more detailed description and the drawings, in which.

Figure 12:
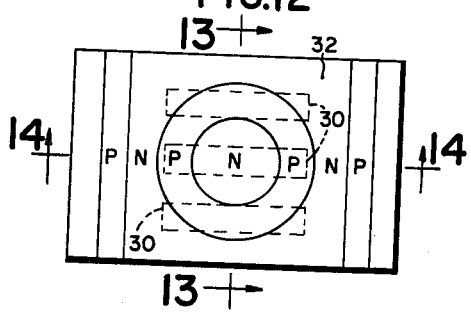
Figure 13:
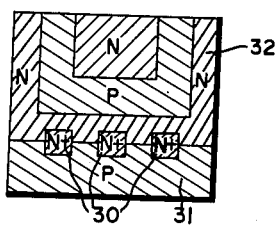
Figure 14:
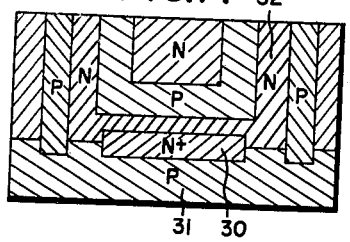

FIG. 12 is a greatly enlarged, somewhat schematic plan view showing an epitaxial transistor of the invention having low resistivity strips beneath the collector; and FIGS. 13 and 14 are transverse sections taken along lines 13—13 and 14—14, respectively, of FIG. 12.

Figure 1:
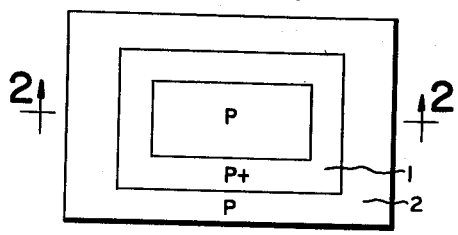
FIG. 1 is a somewhat schematic, greatly enlarged plan view of a substrate having a pattern of impurities prediffused into its surface.
Figure 2:
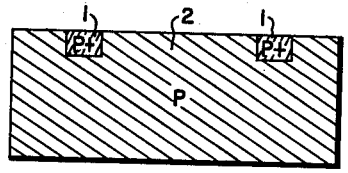
FIG. 2 is a transverse section taken along line 2—2 of FIG. 1.

Referring now to FIGS. 1 and 2, a pattern of impurities 1 is formed on substrate 2. This is usually done by masking the surface of the substrate with a material resistant to diffusion. When the substrate is silicon, silicon dioxide is the preferred mask. Holes are etched in the mask where the pattern is required, by photoengraving processes known in the art. The surface of the substrate is then subjected to a gaseous atmosphere containing the desired impurities. These impurities diffuse into the unmasked portions of the surface of substrate 2. The diffusion time and depth depend upon the resistivity and depth of the pattern desired. The use of this method of forming the impurity pattern, however, is not essential to the invention. Alternatively, the impurity pattern may be deposited on the substrate in any manner, as by painting or spraying a slurry or mixture containing the impurity element or its oxides. In the example illustrated, the impurities used were P-type, such as gallium, aluminum, boron, or indium. If an N-type pattern were desired, N-type impurities, such as antimony, arsenic, or phosphorus would be used. The choice of specific impurity used often depends upon its diffusion rate.

Figure 3:
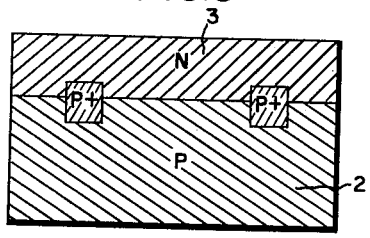
FIG. 3 is a greatly enlarged, somewhat schematic transverse section showing the substrate of FIGS. 1 and 2 with an epitaxial layer deposited on it.

Referring to FIG. 3, an epitaxial layer 3 is now formed on the substrate 2 and deposited impurity pattern 1. Various methods of forming this epitaxial layer are known in the art. They are described in Hunter, L. P., Handbook of Semiconductor Electronics, 2d ed., Subchapter 7.11 (York, Pennsylvania, 1962).

Figure 4:
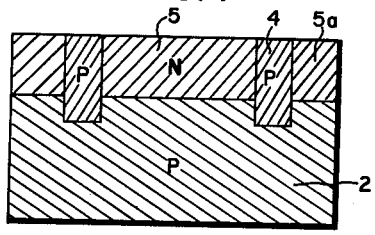
FIG. 4 is a greatly enlarged, somewhat schematic transverse section showing the device of FIG. 3 after diffusion of the pattern of impurities into the epitaxial layer.

Referring to FIG. 4, the time and temperature used in the growth of the epitaxial layer 3 is often such that region 4 is diffused completely through the epitaxial layer while it is being grown. Heating causes these impurities to diffuse. The amount of the concurrent diffusion is governed by the time and temperature chosen for epitaxial growth and the diffusion rate of the impurities used. If the surface of the device is to be subsequently oxidized for protection, some diffusion will also occur at that time. Therefore, where complete diffusion does not occur during epitaxial growth, it is sometimes completed during subsequent oxidation; if not, a separate diffusion step is required to complete the pattern. When region 4 has been completely diffused outwardly to the surface of the epitaxial layer 3, region 5 is effectively isolated by region 4. A transistor may be located in this isolated region 5, if desired. It will be effectively isolated from the portion 5a of the epitaxial layer 5 located outside of isolating region 4.

Figure 5:
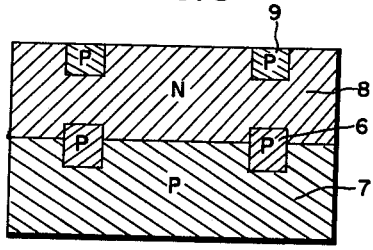
FIG. 5 is a greatly enlarged, somewhat schematic transverse section showing an alternative method of this invention.

Another embodiment of the invention is illustrated in FIG. 5. A first pattern of impurities 6 is formed on substrate 7 as described above. Epitaxial layer 8 is then grown on the substrate 7 and impurity pattern 6. In the method illustrated, the impurities do not diffuse completely through the epitaxial layer during its growth. A second matching pattern of impurities 9 is formed on top of the epitaxial layer 8 in alignment with the first pattern 6. During diffusion, the first pattern 6 diffuses outwardly to meet the second pattern 9 which diffuses inwardly. The two diffusing regions meet, forming the same isolating region 4 shown in FIG. 4.

Figure 6:
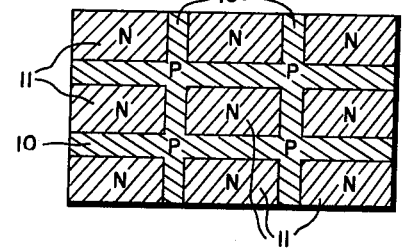
FIG. 6 is a somewhat schematic, greatly enlarged plan view of a grid pattern formed in an epitaxial layer by the method of this invention.

FIG. 6 shows another impurity pattern 10 which has been formed in an epitaxial layer according to the invention. A device may be placed in each of the N-type spaces 11 of the checkerboard so that each device is electrically isolated from the rest by the P-type grid pattern 10. Of course, the conductivity types may be reversed.

Figure 7:
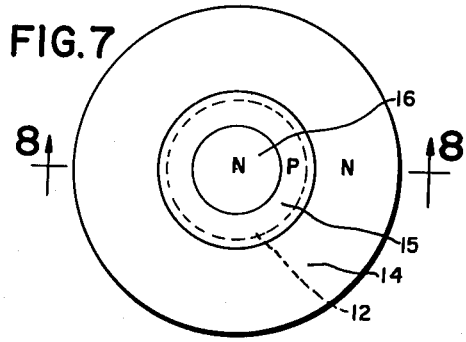
FIG. 7 is a somewhat schematic, greatly enlarged, plan view of an epitaxial transistor having a pattern of impurities in an epitaxial layer made by the method of this invention.
Figure 8:
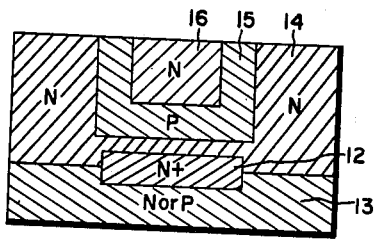
FIG. 8 is a transverse section taken along line 8—8 of FIG. 7.

Isolating regions used to isolate separate devices on the same body of semiconductor are just one impurity pattern which may be formed by the method of the invention. Another such pattern shown in FIGS. 7 and 8, is used to make novel epitaxial transistors. These transistors have an extra low-resistivity region 12, formed in substrate 13 and epitaxial layer 14 by the method of the invention. The resistivity of a region formed in this way can be made lower than is easily possible by heavily doping the substrate during its growth. A low-resistivity region beneath the collector provides a path for charged carriers in the collector, thereby substantially reducing the saturation resistance of the device. This prevents the voltage drop otherwise caused by this unnecessary resistance.

The devices of FIGS. 7 and 8 are made by forming a pattern of impurities on substrate 13, as done in previous examples, which will be diffused to form region 12. Epitaxial layer 14 of the same conductivity type as these impurities is then grown upon the substrate 13 and the deposited pattern of the impurities. During or after the epitaxial growth, these impurities are diffused into the epitaxial layer 14 to form low-resistivity N+ region 12, shaped as shown. P-type base region 15 and N-type emitter region 16 are then formed in the N-type epitaxial layer 14 by methods well known in the art.

It is understood that by an N region, what is meant is a region of N-type conductivity having a concentration of N-type impurities of from about $10^{15}$ to $7 \times 10^{19}$ atoms per cc. An N+ region has a doping level from about $7 \times 10^{19}$ up to the solubility limit of the impurity used, which in practice may be about $2 \times 10^{21}$ with arsenic, for example.

There are substantial advantages to having substrate 13 of the opposite conductivity type from region 12. If they are of opposite conductivity type, there is a PN junction between them. When this junction is reverse-biased, there is force upon the stored minority carriers in the collector, causing them to be swept through region 12 and across this reverse-biased junction. Region 12 acts as a sink for these minority carriers which pass from the base region 15 (in which they are majority carriers) into the collector region of the transistor. The high concentration of impurities in low resistivity region 12 traps these minority carriers, improving their chances of recombination with carriers of the opposite type. Additionally, many are swept across the PN junction and removed that way. This decreases the switching time when the transistor is used for switching.

An even greater reduction in switching time can be obtained if the transistor is also doped with a compensating element, e.g., gold, particularly in the region near the base-collector junction. Such compensating elements serve as minority carrier traps to decrease carrier lifetime in the same way as does region 12. However, there are disadvantages associated with the use of a compensating element. The resistivity in both the base and collector regions is raised by the presence of the gold, causing a high saturation resistance. This results in a higher collector-emitter saturation voltage, as described earlier. Finally, gold doping in the base region causes recombination of minority charge carriers in that region, as well, thus increasing the base current when the device is conducting. This reduces the device's current gain, which is particularly undesirable when the transistor is used as an amplifier.

It has been found that the switching characteristics of the epitaxial transistor shown in FIGS. 7 and 8 (with a P-type substrate), without any additional doping with a compensating element, are substantially equivalent to those of a conventional epitaxial transistor which has gold doping but no low resistivity region 12. This turns out to be particularly desirable because of the above-mentioned disadvantages inherent in using a compensating element.

Figure 9:
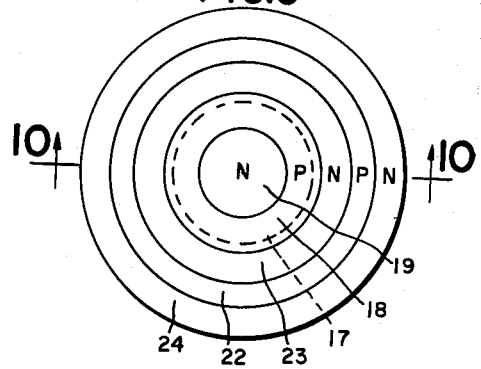
FIG. 9 is a greatly enlarged, somewhat schematic plan view of an isolated epitaxial transistor of this invention.
Figure 10:
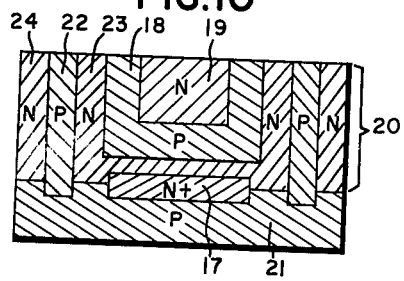
FIG. 10 is a transverse section taken along the line 10—10 of FIG. 9.

Referring now to FIGS. 9 and 10, regions 17, 18, 19, and epitaxial layer 20 are formed on substrate 21 in the same manner as was done above in FIGS. 7 and 8. Additionally, however, isolating region 22 is formed by the method of the invention. If desired, the impurities forming this region 22 may be deposited along with the impurities forming region 17. They may then be diffused to form region 22 at the same time as region 17 is formed.

Region 17 should be a thin layer or epitaxial layer 20 would have to be undesirably thick in order to leave room to diffuse in the base and emitter regions 18 and 19 above it. Therefore care must be taken, if regions 17 and 22 are to be diffused simultaneously, that region 22 diffuses all the way through the epitaxial layer while region 17 diffuses only a relatively short distance. One way of achieving this is to diffuse region 22 both from above and below, as described earlier, in order to shorten the required diffusion time. Another way is to use impurities for region 17 which are much slower-diffusing than the impurities for region 22. Still a third way is to pre-diffuse the impurities for region 17 into the substrate before the region 22 impurities are deposited. This decreases the concentration of the region 17 impurities at the substrate surface. Since diffusion rate of these impurities into the epitaxial layer is proportional to their concentration at the substrate surface, their diffusion rate into the epitaxial layer is slowed. Any of these methods, as well as a combination, may be used. Specifically, where phosphorus is the region 17 impurity, pre-diffusion into the substrate is highly desirable. Where antimony is used, diffusion is slower and hence pre-diffusion of region 17 is not always required, depending, of course, on the diffusion rate of the impurities used for isolating region 22. Isolating region 22 isolates the portion 23 of the epitaxial layer 20 in which the transistor is located from the remainder 24 of the epitaxial layer.

Figure 11:
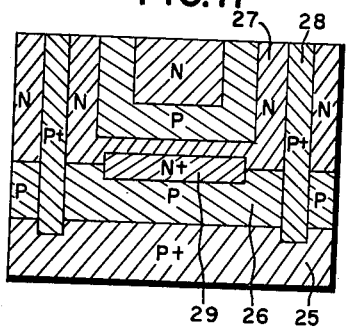
FIG. 11 is a greatly enlarged, somewhat schematic transverse section showing another embodiment of the invention.

A device of another embodiment of this invention is shown in FIG. 11. This device is the same as that shown in FIGS. 9 and 10, except that a lower resistivity P+ substrate 25 is used. It has two epitaxial layers upon it. The lower layer 26 is P-type, the same as previously used for the substrate, and the upper layer 27 is N-type. The impurity pattern required to form both isolating region 28 and lower resistivity region 29 is formed on lower layer 26 as described earlier in this specification. This is done between the epitaxial growth of lower layer 26 and upper layer 27. The isolating region 28 is diffused not only upwardly through the upper N-type epitaxial layer, but also downwardly through lower P-type epitaxial layer 26 to contact the P+ substrate 25. Preferably, the isolating region 28 is also low resistivity. This embodiment has the advantage of providing a low resistivity connection between the bottom surface of the device (to which connections are often made) and the isolating region 28. This low resistivity connection substantially increases the transconductance of the isolation region.

Another embodiment of the invention is shown in FIGS. 12, 13, and 14. This embodiment illustrates a rectangular configuration of a transistor, rather than circular. The particular shape chosen is not essential to the invention; it may be left as a matter of choice by the practitioner. This embodiment is similar to that shown in FIGS. 9 and 10, except that there are a plurality of spaced low resistivity regions 30 which are formed by the method of this invention. The advantage of having a plurality of spaced low resistivity regions rather than one solid region is as follows. When the junction between the substrate 31 (P-type in the illustration) and the collector 32 of the opposite conductivity type from the substrate is reverse-biased, the minority carriers in the base which are not caused to recombine in the low resistivity regions 30 are swept into the substrate across the PN junction, as explained above. This transfer of carriers furnishes an alternate way of removing stored carriers to reduce switching time. The removal, however, is more effective across a PN junction than across a PN+ junction. Therefore, in this embodiment, the spaced N+ low resistivity regions 30 provide a sink to cause minority carriers to recombine while the spaces between them provide a path for removal of those carriers which do not so recombine. A geometrical configuration such as the one illustrated in FIGS. 12, 13, and 14, makes optimum use of these two complementary effects.

Figure 15:
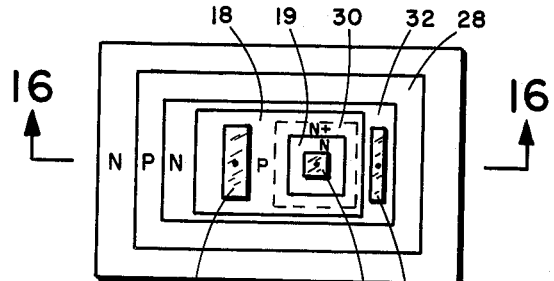
Figure 16:
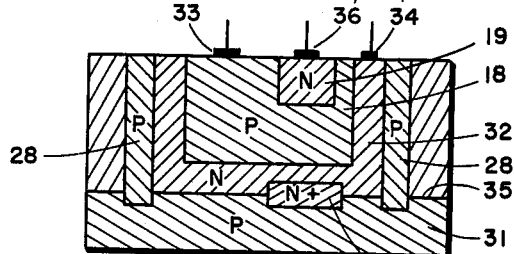

Referring now to FIGS. 15 and 16, another geometrical configuration of a device much the same as the one shown in FIGS. 12, 13, and 14 is shown. The principal difference in the geometry of this device from the geometry of the device of FIGS. 12, 13, and 14 is the lateral configuration of N+ region 30. In FIG. 13, the required spaces beneath the base region are provided by using a plurality of spaced N+ regions 30. In the device of FIGS. 15 and 16, on the other hand, a single N+ region 30 is used beneath base region 18; this single region 30, however, is not coextensive in lateral extent with the base region, as shown in FIG. 15. The N+ region 30 does not extend beneath the left portion of base region 18 underneath the base contact 33. Since no emitter current flows towards the collector in this portion of the base region, an N+ region in this area of the device to reduce collector spreading resistance is unnecessary. The N+ region beneath the emitter region 19 serves as the minority carrier sink to reduce switching time, as discussed above.

The absence of the N+ region beneath base contact 33 allows the injected carriers from collector region 32 to be swept out across the reverse-biased PN junction between substrate 31 and collector region 32 during the saturation condition. As discussed above, the removal of these carriers decreases the time required to turn the transistor off from saturation.

Figure 17:
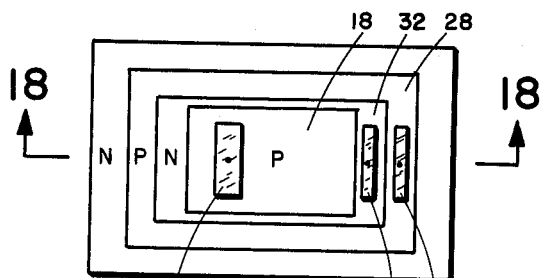
Figure 18:
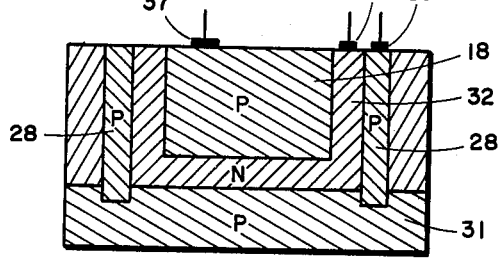

The transistor shown in FIGS. 17 and 18 is substantially the same transistor as shown in FIGS. 15 and 16 except that no N+ region 30 was used. Note that region 18 (which was the base region of the NPN transistor of FIGS. 15 and 16) is now the emitter region of the PNP transistor of FIGS. 17 and 18. Correspondingly, region 32 (which was the collector region of the NPN transistor of FIGS. 15 and 16) is the base region of the PNP transistor of FIGS. 17 and 18. Finally, region 31 (which was the substrate in the transistor of FIGS. 15 and 16) is the collector region of the PNP transistor of FIGS. 17 and 18. It should be obvious to the skilled practitioner that the transistors of FIGS. 15 and 16 and of FIGS. 17 and 18 may be formed within a single wafer of semiconductor material in the same diffusion cycle. Each transistor then represents an isolated device in an integrated circuit with isolation regions 28 separating the individual devices. The base region of the NPN transistor can be diffused simultaneously with the emitter region of the PNP transistor. During the diffusion of the N+ region 30 for the NPN transistor, the surface of the PNP transistor is completely masked, as is well known in the art. Accordingly, no impurities enter the substrate to be used for the PNP transistor during the diffusion of the N+ region 30 for the NPN transistor. The same procedure is used for masking the surface of the PNP transistor during the diffusion of N-type emitter region 19 in the NPN transistor.

The attachment of ohmic contacts, such as emitter contact 36, base contact 33, and collector contact 34 for the NPN transistor shown in FIGS. 15 and 16, and the emitter contact 37, the base contact 38, and the collector contact 39 for the PNP transistor shown in FIGS. 17 and 18, are conventional and need no further description here. Moreover, when the above NPN and PNP transistors are formed on the same wafer in an integrated circuit, appropriate interconnections are normally made on the surface of the wafer between desired contacts of the two devices, as described in U.S. Patent 2,981,877, assigned to the same assignee as this invention. This again is now within conventional practice and needs no further description.

In order to demonstrate the substantial advantages provided by the novel epitaxial transistors of the invention, the following comparative examples are presented:

*Example I*

Two identical isolated epitaxial transistors of the type shown in FIGS. 9 and 10 were prepared. Each had the conventional emitter, base, and collector regions of N, P, and N-type conductivity, respectively. Each transistor was isolated from the surrounding semiconductor material by an isolating region of P-type conductivity. This isolating region formed a PN junction with the collector. The only difference between the two transistors was that only one of them had the low-resistivity region of N-type conductivity between the collector region and the isolating region (as shown in FIGS. 9 and 10), according to the teachings of the invention. The other one did not. Both had their isolation regions grounded to form the reverse-biased junction beneath the collectors.

The switching time of the two transistors was measured on a Tektronix type-R switching time tester. The device without the additional low resistivity region of the invention had switching time of 80–95 nanoseconds; the device with the additional low resistivity region had a switching time of 14–16 nanoseconds. Thus, at least a five-fold reduction in switching time was achieved with the device having the improvement of the invention.

Additionally, the saturation voltages of the two devices were measured, using a 5 ma. collector current and a 1 ma. base current. With the device lacking the low resistivity region, the collector-emitter saturation voltage was 1.5–5.0 volts. With the device of the invention, it was 0.18–0.20 volts. This lower saturation voltage is desired in switching application. Furthermore, in the "ON" position, the power loss (which is proportional to the saturation voltage) is substantially reduced in the device of the invention.

*Example II*

This example compares a transistor as shown in FIGS. 9 and 10 with a conventional transistor which does not have the additional low resistivity region of the invention. However, the conventional transistor has been doped with a compensating element (gold) to improve its switching characteristics.

The switching time of the two transistors was measured on a Tektronix type-R switching-time tester, with the isolation regions connected to ground. The switching times of both devices were comparable: the device having the extra low resistivity region of the invention had a switching time of about 18 nanoseconds; the prior art gold-doped device had a switching time of about 14 nanoseconds.

The essential difference between the characteristics of the two devices was in their saturation resistances. The conventional device having the gold doping had a saturation resistance of about 800 ohms; the device having the low resistivity region of the invention, and no gold, had a saturation resistance of only 40 ohms. This higher saturation resistance of the conventional device causes an undesirably high collector-emitter saturation voltage. Therefore, the device of this invention is a more perfect switch because it can be switched to a lower voltage; yet it still has the improved switching speed previously obtained only with gold doping.

As will be obvious to the skilled practitioner, various modifications may be made in the method and devices of the invention which are still within its spirit and scope. Therefore, the only limitations to be placed on the scope of the invention are those expressed in the following claims:

What is claimed is:

1. An improved isolated epitaxial transistor comprising a body of semiconductor material including an emitter, a base, and a collector region; and
   a fourth region adjacent to said collector region of the same conductivity type as said collector region and having a lower resistivity and lesser lateral extent than said collector region; and
   an isolating region surrounding said transistor of the opposite conductivity type from said collector region, a part of which is adjacent to said fourth region.

2. Transistor of claim 1 wherein said part of said isolating region is a substrate of said opposite conductivity type.

3. The transistor of claim 1 wherein said part of said isolating region is epitaxial material of said opposite conductivity type grown on a substrate of said opposite conductivity type.

4. The transistor of claim 1 wherein said fourth region is broken into spaced-apart portions.

5. The transistor of claim 4 wherein said portions are parallel strips.

6. An integrated circuit having at least two complementary transistors with improved switching characteristics, comprising a body of semiconductor material including:
   a substrate of one conductivity type;
   an epitaxial layer of the opposite conductivity type deposited upon said substrate;
   two isolation grids of said one conductivity type extending from said substrate to the surface of said body;
   a first base region of said one conductivity type inset into said epitaxial layer and sharing a common upper surface therewith, said first base region being surrounded by one of said isolation grids and separated therefrom by said epitaxial layer;
   a first emitter region of said opposite conductivity type inset into said first base region and sharing a common upper surface therewith;
   a second emitter region of said one conductivity type of the same depth as said first base region inset into said epitaxial layer and sharing a common upper surface therewith, said second emitter region being surrounded by the other of said isolation grids and separated therefrom by said epitaxial layer; and
   an additional region of said opposite conductivity type having a lower resistivity and lesser lateral extent than the portion of said epitaxial layer within said one isolation grid, said additional region being located beneath said first base region within said one isolation grid adjacent to said substrate and said epitaxial layer.

References Cited by the Examiner

UNITED STATES PATENTS

| | | | |
|---|---|---|---|
| 2,993,154 | 7/1961 | Goldey et al. | 317—235 |
| 3,089,794 | 5/1963 | Marinace | 317—235 |
| 3,138,721 | 6/1964 | Kilby | 317—235 |
| 3,141,135 | 7/1964 | Amlinger et al. | 317—235 |
| 3,146,135 | 8/1964 | Sah | 317—235 |

JOHN W. HUCKERT, *Primary Examiner.*

J. D. KALLAM, *Examiner.*